US012784172B2

(12) United States Patent
Lin et al.

(10) Patent No.: US 12,784,172 B2
(45) Date of Patent: Nov. 3, 2026

(54) METHODS FOR INDICATION CLASSIFICATION IN THERMAL ACOUSTIC IMAGING INSPECTION

(71) Applicant: RTX Corporation, Farmington, CT (US)

(72) Inventors: Yiqing Lin, Farmington, CT (US); Ozgur Erdinc, Farmington, CT (US); Kin Gwn Lore, Farmington, CT (US); Bruno Abreu Calfa, Farmington, CT (US); Hongyu Zhu, Farmington, CT (US); David A. Raulerson, Farmington, CT (US); Ningli Yang, Farmington, CT (US); Amit Surana, Farmington, CT (US)

(73) Assignee: RTX Corporation, Farmington, CT (US)

( * ) Notice: Subject to any disclaimer, the term of this patent is extended or adjusted under 35 U.S.C. 154(b) by 257 days.

(21) Appl. No.: 18/632,945

(22) Filed: Apr. 11, 2024

(65) Prior Publication Data

US 2025/0322506 A1 Oct. 16, 2025

(51) Int. Cl.

*G06T 7/00* (2017.01)
*G06V 10/46* (2022.01)
*G06V 10/774* (2022.01)

(52) U.S. Cl.

CPC .......... *G06T 7/0004* (2013.01); *G06V 10/469* (2022.01); *G06V 10/774* (2022.01)

(58) Field of Classification Search

CPC .. G06T 7/0004; G06V 10/469; G06V 10/774; G01N 25/72; G01N 29/4481

See application file for complete search history.

(56) References Cited

U.S. PATENT DOCUMENTS 7,064,330 B2 6/2006 Raulerson et al.
7,549,339 B2 * 6/2009 Staroselsky ............ G01N 25/72 250/341.1

(Continued)

FOREIGN PATENT DOCUMENTS

CN 113252790 A 8/2021
CN 114894897 A 8/2022

OTHER PUBLICATIONS

European Search Report dated Sep. 8, 2025 issued in corresponding application 25169861.9.

(Continued)

*Primary Examiner* — Oneal R Mistry

(74) *Attorney, Agent, or Firm* — Millen, White, Zelano & Branigan P.C.; William F. Nixon

(57) ABSTRACT

Methods are used by a thermal acoustic imaging (TAI) inspection system to identify potential defects within a component scanned, such as an engine fan blade. The inspection system generates a TAI scan having a plurality of frames. Indications are identified in at least one frame of the plurality of frames. An extractor model is applied to the plurality of frames to extract a plurality of spatial features corresponding to the indication. The plurality of spatial features is concatenated from each frame to generate a time series value of the values for the features. The plurality of spatial features is combined into multiple sequence data. The multiple sequence data includes a plurality of temporal features. The multiple sequence data is provided to train a neural network model to predict defects. For trained neural network models, the multiple sequence data is used to predict if the indication is a defect.

19 Claims, 6 Drawing Sheets

(56) References Cited

U.S. PATENT DOCUMENTS

2018/0306728 A1* 10/2018 Sofer ............... G05B 19/41875
2021/0318673 A1* 10/2021 Kitchen ............... B23K 31/006
2024/0005645 A1* 1/2024 Cha ...................... G06V 10/774
2025/0322506 A1* 10/2025 Lin ........................ G01N 25/72
2026/0100028 A1* 4/2026 Sadeghigooghari ......................... G06N 3/0464

OTHER PUBLICATIONS

Gou Yi et al: "Algorithm analysis of defect depth for PVC plate with flat-bottomed holes in active pulsed infrared thermography", Measurement Science and Technology, IOP, Bristol, GB, vol. 34, No. 8, May 19, 2023, pp. 1-11.
Ciampa et al. "Recent Advances in Active Infrared Thermography for Non-Destructive Testing of Aerospace Components". 2018. Sensors. vol. 18. Issue 2.
Derusova et al. "Evaluation of equivalent defect heat generation in carbon epoxy composite under powerful ultrasonic stimulation by using infrared thermography". 2015. IOP Conference Series: Materials Science and Engineering. vol. 81. pp. 012084.
Sezgin et al. "Survey over image thresholding techniques and quantitative performance evaluation". 2004. Journal of Electronic Imaging. vol. 13. Issue 1. pp. 146-165.

* cited by examiner

METHODS FOR INDICATION CLASSIFICATION IN THERMAL ACOUSTIC IMAGING INSPECTION

FIELD OF THE INVENTION

The disclosed embodiments relate to methods for automated spatial-temporal indication classification in thermal acoustic imaging inspection operations for a component. More particularly, the disclosed embodiments relate to training a neural network model using automated spatial-temporal indication classification of data captured by a thermal acoustic imaging scan.

DESCRIPTION OF THE RELATED ART

Thermal acoustic imaging (TAI) is a category of non-destructive testing (NDT) for components and parts. For example, TAI inspection operations can be used to detect damage in engine fan blades. Some TAI inspection systems collect a set of time-series temperature data at each pixel of the fan blade image using a video recording infrared (IR) camera. Part defects are represented by anomalies in the IR image data for the component. Manual analysis of the data to determine defects is time consuming.

A need may be appreciated that the detection of defects may be automated to reduce time intensive review.

SUMMARY OF THE INVENTION

A method is disclosed. The method includes generating a training thermal acoustic imaging (TAI) scan of a first component. The training TAI scan includes a plurality of frames showing known positive and false samples of a defect within the training TAI scan of the first component. The method also includes applying a visual feature extractor model to the plurality of frames within the training TAI scan. The method also includes extracting a plurality of spatial features for a signal corresponding to a selected indication type shown in the training TAI scan using the visual feature extractor model. The method also includes concatenating the plurality of spatial features of the signal from each frame of the plurality of frames to generate a time series value for the respective frame. The method also includes combining a plurality of time series values into multiple sequence data for the training TAI scan. The multiple sequence data includes a plurality of temporal features. The method also includes training a neural network model using the multiple sequence data to predict the selected indication type in the training TAI scan as being a defect or a non-defect within the first component.

A method is disclosed. The method includes receiving an initial thermal acoustic imaging (TAI) scan of a component. The initial TAI scan includes a plurality of frames showing an identified possible defect within the component. The method includes applying a trained neural network model to the plurality of frames of the initial TAI scan. The method also includes predicting whether the identified possible defect is an actual defect using the trained neural network model. The trained neural network is trained by generating a training TAI scan. The training TAI scan includes a plurality of frames showing known positive and false samples of a defect within a training component. The trained neural network further is trained by applying a visual feature extractor model to the plurality of frames within the training TAI scan. The trained neural network further is trained by extracting a plurality of spatial features for a signal corresponding to a selected indication type shown in the training TAI scan using the visual feature extractor model. The trained neural network further is trained by concatenating the plurality of spatial features of the signal from each frame of the plurality of frames to generate a time series value for the respective frame. The trained neural network further is trained by combining a plurality of time series values into multiple sequence data for the training TAI scan. The multiple sequence data includes a plurality of temporal features. The trained neural network further is trained by using the multiple sequence data to predict the selected indication type as being a defect or a non-defect within the training TAI scan.

A method is disclosed. The method includes generating a training thermal acoustic imaging (TAI) scan of a first component. The training TAI scan includes a plurality of frames showing at least one indication within the training TAI scan of the first component. The method also includes generating video data for the at least one indication within the plurality of frames. The video data uses three different channels. At least one channel includes temperature data of the at least one indication. The method also includes applying a visual feature extractor model to the video data for the plurality of frames within the training TAI scan. The method also includes extracting a plurality of spatial features for the video data for the plurality of frames within the training TAI scan. The method also includes concatenating the plurality of spatial features of the signal from each frame of the plurality of frames to generate a time series value for the respective frame. The method also includes combining a plurality of the time series values into multiple sequence data for the training TAI scan. The multiple sequence data includes a plurality of temporal features. The method also includes training a neural network model using the multiple sequence data to predict the selected indication type in the training TAI scan as being a defect or a non-defect within the first component.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, numerous variations are possible. For instance, structural elements and process steps may be rearranged, combined, distributed, eliminated, or otherwise changed, while remaining with the scope of the disclosed embodiments.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and which some features may be exaggerated and some features may be omitted or may be represented schematically in the interest of clarity. Like reference numerals in the drawings may represent and refer to the same or similar element, feature, or function. In the drawings.

DETAILED DESCRIPTION OF THE PREFERRED EMBODIMENTS

Figure 1:
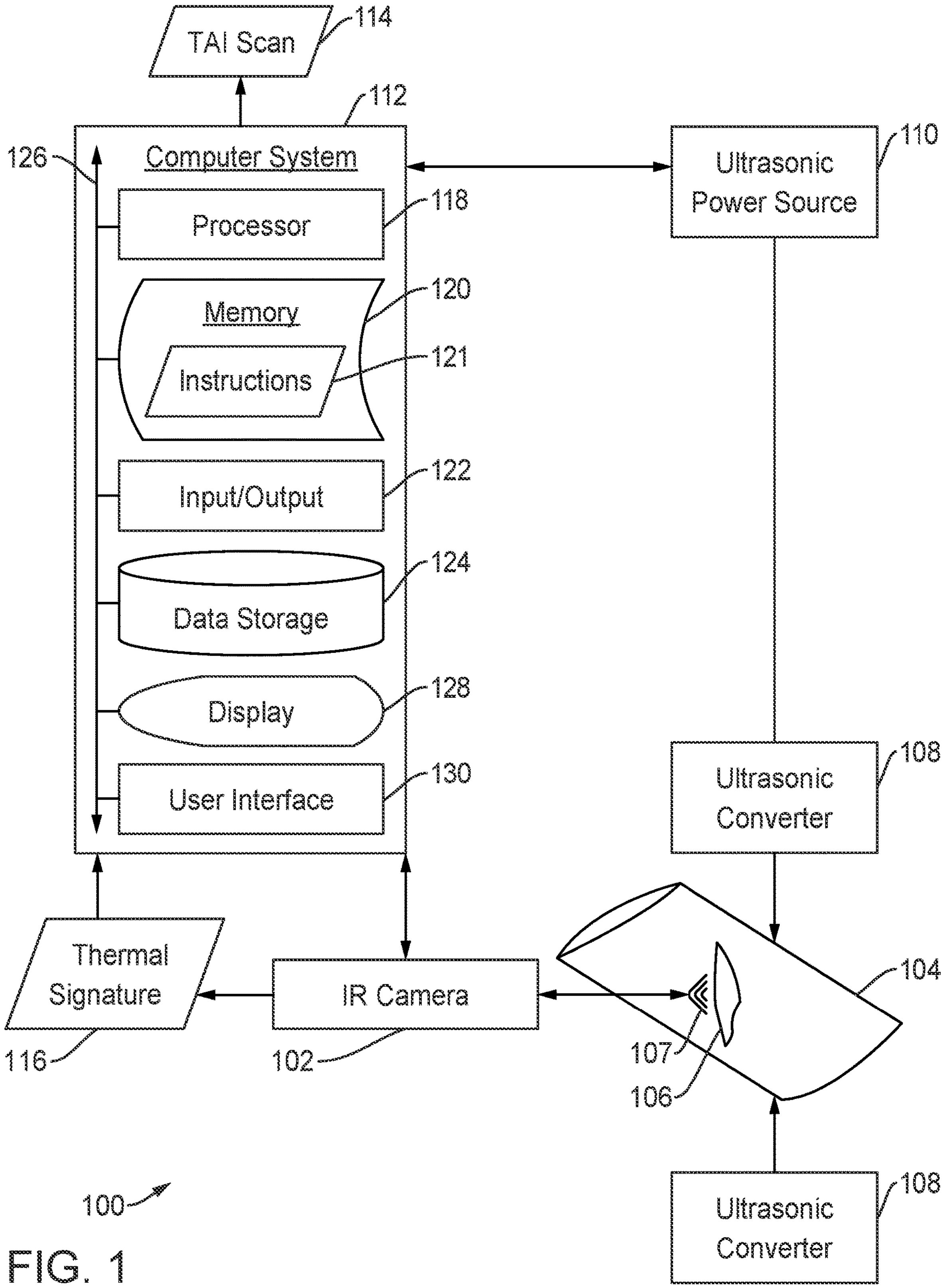
FIG. 1 illustrates a block diagram of a thermal acoustic imaging (TAI) inspection system according to the disclosed embodiments.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of the embodiments of the inventive concepts, numerous specific details are set forth in order to provide a more thorough understanding of the inventive concepts. It will be apparent to one skilled in the art, however, having the benefit of the instant disclosure that the inventive concepts disclosed herein may be practiced without these specific details.

As used herein, a letter following a reference numeral is intended to reference an embodiment of the feature or element that may be similar, but not necessarily identical, to a previously described element or feature bearing the same reference numeral, such as 1, 1a, or 1b. Such shorthand notations are used for purposes of convenience only, and should not be construed to limit the inventive concepts disclosed herein in any way unless expressly stated to the contrary.

Moreover, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

The inventive concepts may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

Inventive concepts may be implemented as a computer process, a computing system or as an article of manufacture such as a computer program product of computer readable media. The computer program product may be a computer storage medium readable by a computer system and encoding computer program instructions for executing a computer process. When accessed, the instructions cause a processor to enable other components to perform the functions disclosed below.

As used herein, "aft" refers to the direction associated with the tail, or the back end, of an aircraft, or to the direction of exhaust of the gas turbine. As used here, "forward" refers to the direction associated with the nose, or front end, of the aircraft, or to the direction of flight or motion.

The disclosed embodiments consider both spatial and temporal features of image data collected during a TAI process. The time series temperature data of all pixels are formed into a data cube as video data. Standard video data may have multiple channels, such as red, green, and blue. Each channel may represent the original time-series temperature data, or, alternatively, derived features of the original temperature data. For example, the original data may be transformed into different data sets based on the derived features.

Once the video data are generated, a visual feature extractor extracts features from each video frame. The features extracted from each frame are concatenated into multiple time series of feature data. A supervised training model is applied on the features to classify the video data. Further, the disclosed embodiments provide one or more methods for training a neural network model to predict whether a defect is likely within a TAI scan of a component.

The temperature-time profiles of crack-like indications have both temporal and spatial features. These features may be analyzed separately. The disclosed processes analyze both features in a consistent and comprehensive manner that helps improve the classification accuracy. In addition, once the original data are converted into video data, pre-existing feature extractors may be used to accelerate the training of the neural network model. The ability to leverage an existing model helps improve the efficiency of training as the models may use pre-selected features that are useful for image and video-based data.

FIG. 1 depicts a block diagram of a thermal acoustic imaging (TAI) inspection system 100 according to the disclosed embodiments. TAI refers to a category of non-destructive testing (NDT) also called thermographic inspection that is based on the use of images, or image frames, of temperature fields, gradients, or patterns at the surface of a component. TAI inspection by TAI inspection system 100 detects internal and external damage in components, such as hollow-core turbofan engine fan blade 104. TAI inspection system 100 collects a set of time-series temperature data at each pixel of the fan blade image using a video recording IR camera 102. If there is an indication, or discontinuity, in blade 104, then significant friction heat 107 is released around a disbonded region 106 due to vibration. The thermal variations over time are then captured by IR camera 102 to display certain patterns in the time-series temperature data in the indication area.

IR camera 102 may include one or more sensors operable to obtain thermal radiation over a wide spectral range such as from 0.5 to 22 μm in wavelength. In some embodiments, IR camera 102 may include one or more of a short-wave infrared module, a mid-wave infrared module, a long-wave infrared module, a very long-wave infrared module, and a broadband infrared module. The modules may use beam splitters to view a component such as blade 104 through one or more lenses at multiple wavelengths simultaneously. IR camera 102 may cycle through different positions to capture the IR radiation. For example, TAI inspection system 100 may cycle IR camera through 64 positions to acquire the IR video frames. IR camera 102 may capture the thermal radiation during the mechanical excitation, or heat up, phase and a cool down phase.

TAI inspection system 100 also includes ultrasonic converters 108. Ultrasonic converters 108 also may be known as ultrasonic transducers. These items within TAI inspection system 100 convert high frequency electrical energy from ultrasonic power source 110 into mechanical longitudinal vibration that is applied to blade 104. Ultrasonic converters 108 and ultrasonic power source 110 create and transmit sound energy that vibrates blade 104. Friction heat 107 is then detected by IR camera 102. Ultrasonic converters 108 may be capable of generating a broad range of frequencies, for example, from 20 kHz to about 2 MHz. This feature causes localized heating from friction, principally at the edges of a defect in blade 104.

TAI inspection system 100 also includes computer system 112. Computer system 112 may be a digital computer system configured for data acquisition and robotic controls. Computer system 112 also may serve to acquire data captured by IR camera 102 as well as control ultrasonic power source 110. Computer system 112 also may generate TAI scan 114 based on the data, or thermal signature 116, captured by IR camera 102. TAI scan 114 may include a plurality of frames having pixels showing the heat detected by IR camera 102 while blade 104 is subjected to vibrations by ultrasonic converters 108. For example, TAI scan 114 may include the specific raw video frame images of each geometry of blade 104. The output of computer system 112 may be a set of geometric transformations that align images with computer-aided design models of blade 104.

Computer system 112 may include at least one processor 118, a memory 120 having instructions 121, and an input/output (I/O) subsystem 122. These components of computer system 112 may be connected to each other with data bus 126. Processor 118 may execute instructions 121 stored in memory 120 to configure computer system 112 to perform the functions and operations disclosed herein, including operation of ultrasonic power source 110 and IR camera 102. Further, instructions 121 may configure computer system 112 to analyze thermal signature 116 and further process TAI scan 114 to detect and predict defects within the scan of a blade 104.

I/O subsystem 112 may include an I/O controller, a memory controller, and one or more I/O ports. Processor 118 and I/O subsystem 122 are communicatively coupled to memory 120 via data bus 126. Memory 120 may be embodied as any type of computer memory device, such as a volatile memory such as a random access memory. Memory 120 also may be a non-volatile memory storing instructions 121. I/O subsystem 122 also may be communicatively coupled via data bus 126 to a number of hardware, firmware, or software components, including a data storage device 124, a display device 128, and a user interface (UI) subsystem 130.

Data storage device 124 may include one or more hard drives or other suitable persistent storage devices, such as flash memory, memory cards, memory sticks, and the like. A database for models, or TAI scans 114, of blade 104 may reside at least temporarily in data storage device 124. Processing according to the disclosed embodiments of TAI scan 114 also may occur with computing system 112. The operations to execute these processes is disclosed in greater detail below. Alternatively, computing system 112 may provide TAI scan 114 to other devices that are configured to perform the operations disclosed below.

During operation, ultrasonic converters 108 induce elastic waves in blade 104 such that each single frequency of excitation is converted into a broad band of frequencies that are particular to resonant frequencies of blade 104. This vibrational energy is dissipated through conversion into heat due to friction at disbonded region 106. Heat from the blade is observed by IR camera 102, as well as localized heating from a disbond. When blade 104 is vibrated, the whole blade heats up due to friction and any disbands locally heat up more than the surrounding blade. A thermal signature 116 may be observed with IR camera 102. The amount of heat friction 107 that results in thermal signature 116 may depend upon the frequency and position of ultrasonic converters 108 and the size, shape, orientation, and depth of disbonded region 106, as well as the excitation power level.

Part defects may be represented as anomalies in the infrared images within TAI scan 114. TAI scan 114, however, also may include non-crack indications of possible anomalies due to foreign material, non-uniform paint, modal pattern, and noise. Depending on the nature and degree of these type of indications, a part rescan may be desired. Manual analysis of scan data may be tedious, time-consuming, imprecise, and error prone. Thus, TAI inspection system 100 may incorporate an automated method for detecting and classifying any indications to assist inspectors in deciding whether a defect is probable.

In determining the probability of an indication being a defect, TAI inspection system 100 may perform various operations. The operations include detecting defects within blade 104 without a rescan of the blade. For example, if indications within TAI scan 114 is suspected to be defects, then one may rescan blade 104 to see if these indications show up in the rescan data. In some instances, a rescan may not be available. For example, new preprocessing may create new indications. In these situations, all available data generated from scanning operations within TAI inspection system 100 may be used along with multiple machine learning models and advanced statistical methods.

Machine learning models, however, allow a small portion of a missed detection. This issue may be more challenging as there are not many defect samples compared to non-defect samples, which may create an imbalanced data problem. Thus, the disclosed embodiments fuse multiple models based on temporal and spatial features. This feature allows for less false alarms. This increases the detection rate within the trained neural network model used in the place of the rescan of blade 104.

Figure 2:
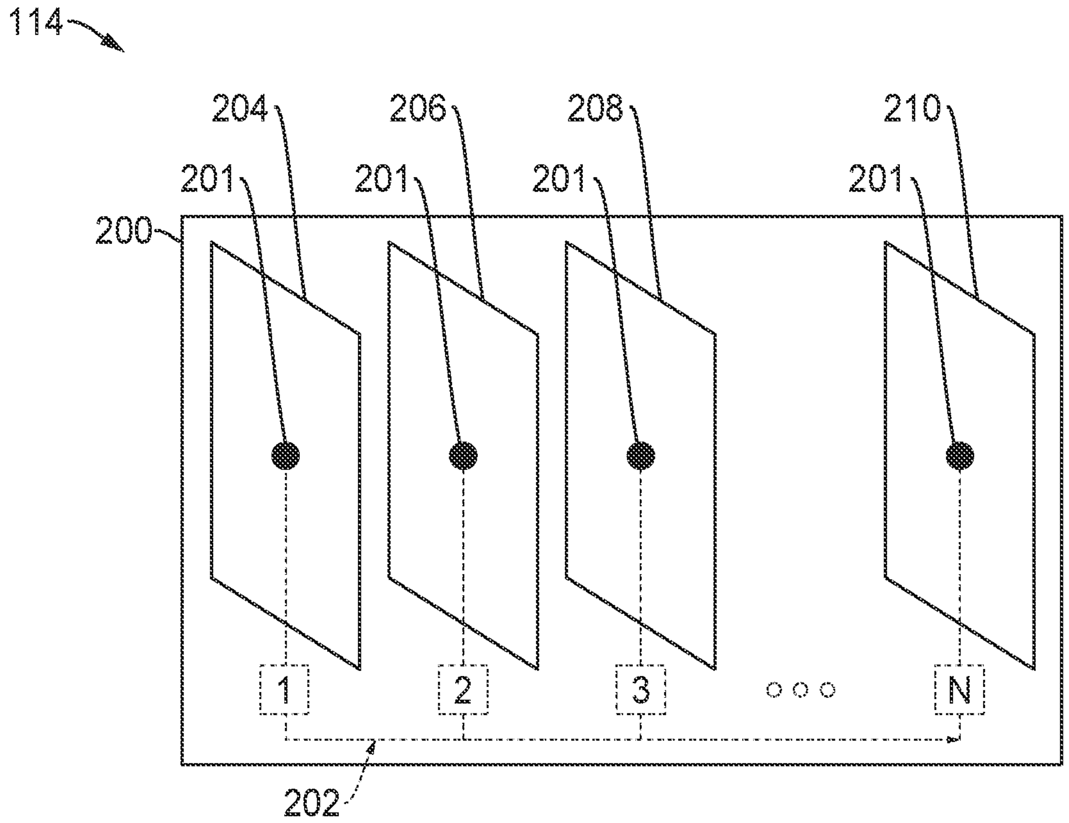
FIG. 2 illustrates a block diagram showing a plurality of frames captured within a TAI scan according to the disclosed embodiments.

FIG. 2 depicts a block diagram showing a plurality of frames 200 captured within TAI scan 114 according to the disclosed embodiments. Frames 200 may correspond to the thermal signatures 116 captured by IR camera 102 over a time period 202. As disclosed above, friction heat 107 is captured by IR camera 102 for radiation emitting from blade 104 over time. Frames also may be referred to as images or image frames.

Plurality of frames 200 includes frame 204, frame 206, frame 208 up to frame 210. Frame 210 may be the final frame in the plurality of frames 200. Frame 204 may be captured at time instance 1. Frame 206 may be captured at time instance 3. Frame 208 may be captured at time instance 3. Additional frames may be caught during additional time instances up to frame 210, which is captured at time N.

Frames 204, 206, 208, up to frame 210 includes pixels within the images of the frames. The pixels may include temperature data as captured by IR camera 102. For example, the pixels may include colors that correspond to a temperature value detected by IR camera 102 for a location on blade 104. Thus, for each frame and time unit, temperature data is captured for each pixel within the images of the frames. For example, pixel 201 is within plurality of frames 200 at a location (x,y) along an x axis and a y axis within a frame. Pixel 201 may exhibit a color for a temperature detected from the heat radiation off the corresponding location on blade 104.

Using the example, pixel 201 in frame 204 at time instance 1 may have a temperature value TM1. Pixel 201 in frame 206 at times instance 2 may have a temperature value TM2, which may differ from temperature value TM1. Pixel 201 in frame 208 may have a temperature value TM3. The temperature values within the subsequent frames may vary up to temperature value TMN for pixel 201 in frame 210. As may be appreciated, all the pixels within plurality of frames 200 may have different temperature values for time period 202. The temperature data may be collected for each pixel.

Figure 3:
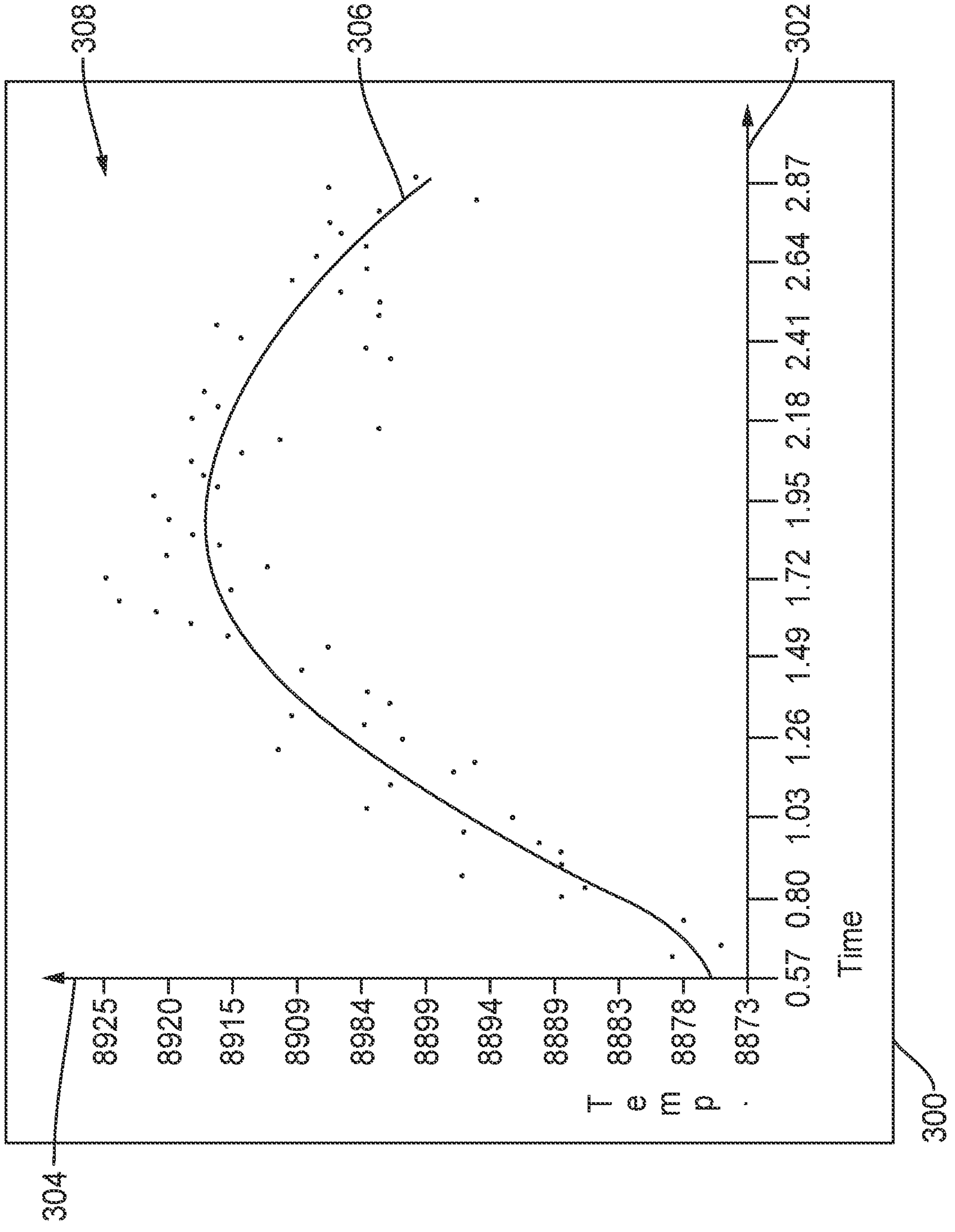
FIG. 3 illustrates a graph of temperature versus time for a pixel for a time period according to the disclosed embodiments.

FIG. 3 depicts a graph 300 of temperature versus time for pixel 201 for time period 202 according to the disclosed embodiments. Graph 300 includes time axis 302 and temperature axis 304. Temperature data 308 may be plotted within graph 300 using time axis 302. For each pixel within a frame of plurality of frames 200, it has one temperature value per frame and time unit. The temperature data of the values for all frames and time units form a time series temperature data set 308. By plotting temperature data set 308 within graph 300, curve 306 may be generated showing the relationship of the temperature values over time.

For example, if curve 306 for the time series temperature data is as shown in FIG. 3, then a fluctuation in temperatures as shown by pixel 201 occurred over time period 202. The fluctuation in temperatures, including the rise in temperature as time went on, may show that a possible defect is exhibited by pixel 201. If curve 306 is relatively flat, then the energy from ultrasonic converters 108 was not converted into heat by blade 104 for the corresponding location. The disclosed embodiments look at the spatial and temporal features exhibited by plurality for frames 200 and within time period 202 simultaneously.

Figure 4:
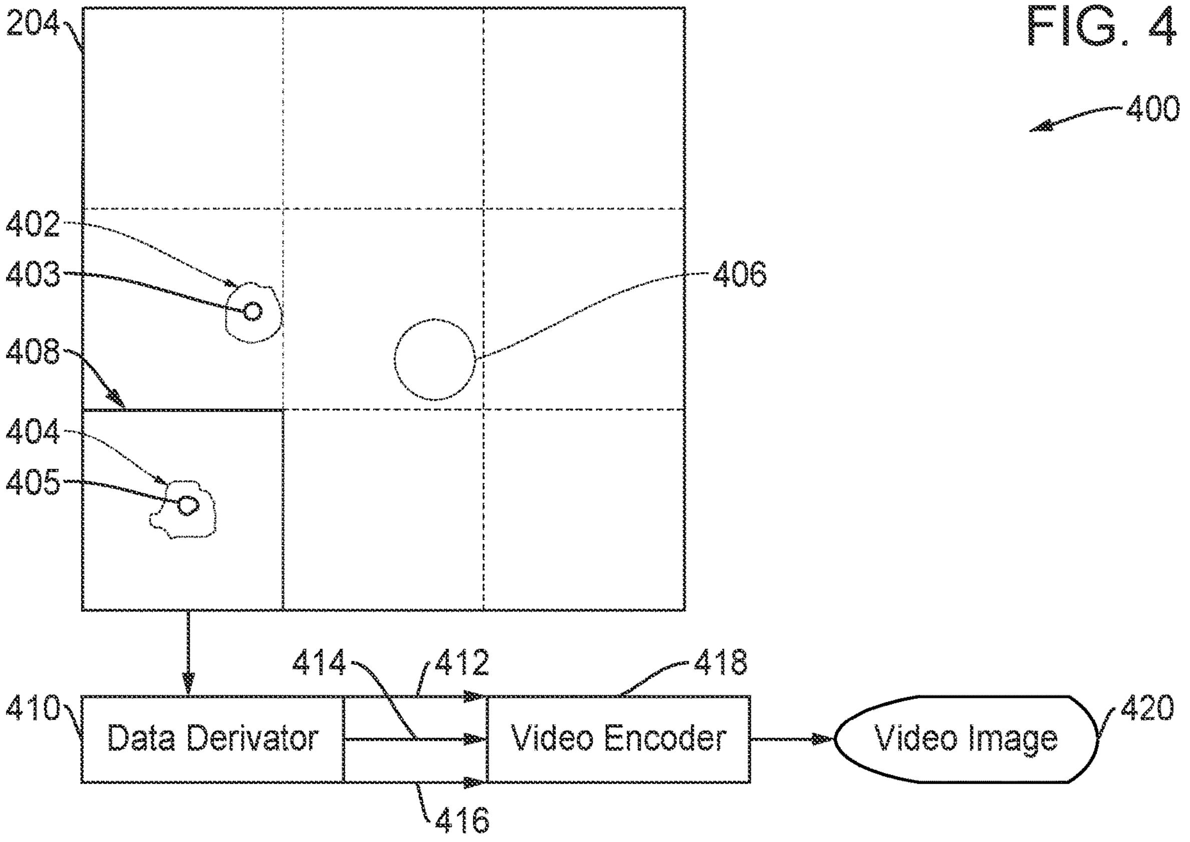
FIG. 4 illustrates a block diagram of a system for generating video data for an indication within the plurality of frames according to the disclosed embodiments.

FIG. 4 depicts a block diagram of a system 400 for generating video data for an indication within the plurality of frames according to the disclosed embodiments. The disclosed embodiments pre-process the raw temperature data for pixels within plurality of frames 200. For example, computer system 112 may pre-process the temperature data. Some suspicious blobs may be identified for further investigation. The suspicious blobs are called indications. Each indication may be a defect or a false alarm, i.e., a non-defect.

Within frame 204, indications 402, 404, and 406 may be identified as possible defects on blade 104 based on TAI scan 114. Indication 402 may include one or more pixels within frame 204. Indication 402 includes spatial features 403, which may be visible within frame 204. Indication 404 also may include one or more pixels within frame 204. Indication 404 also includes spatial features 405. Indication 406 also may be identified. As may be appreciated, indication 406 may be a false alarm or pixels that do not relate to a possible defect. Indication 406, however, is included here to be used for training data.

The disclosed embodiments apply a spatial-temporal process on each indication, as disclosed below. System 400 may perform processing of indications 402, 404, and 406 to prepare for the spatial-temporal process. For example, indication 404 may be within region 408 of frame 204. Region 408 may include spatial features 405 of indication 404. Region 408 is processed by data derivator 410, which processes data related to the region into channels 412, 414, and 416. The data received over channels 412, 414, and 416 are used by video encoder 418 to generate video data for region 408 and indication 404. Video frame 420 may be generated based on the data received over channels 412, 414, and 416.

Channels 412, 414, and 416 may corresponds to the red, green, and blue channels used for video data. Channel 412 may be red. Channel 414 may be green. Channel 416 may be blue. Each channel corresponds to data derived from the raw inspection data for each indication. Channel 412 corresponds to the temperature data captured for indication 404 within frame 204. This data may change in subsequent frames. The other channels include derived features of the temperature data used for channel 412. For example, data derivator 410 may transform the temperature data, such as using a wavelet transform. Another derived feature may be a change of temperature within indication 404. The data for the derived features may be provided to channels 414 and 416.

Video encoder 418 receives the data over the different channels to generate video data in the form of frame or image at each time step for the indications. Video frame 420 includes the red, green, and blue representation of the data derived by data derivator 410 for indication 404. Other video frames are generated for indications 402 and 404. As the derived features from the temperature data for the respective indications are different, the respective video frames 420 also should differ as images for the indications. The disclosed embodiments may generate a video image 420 for each time instance in time period 202 for each indication, such that a plurality of video images is generated.

Figure 5:
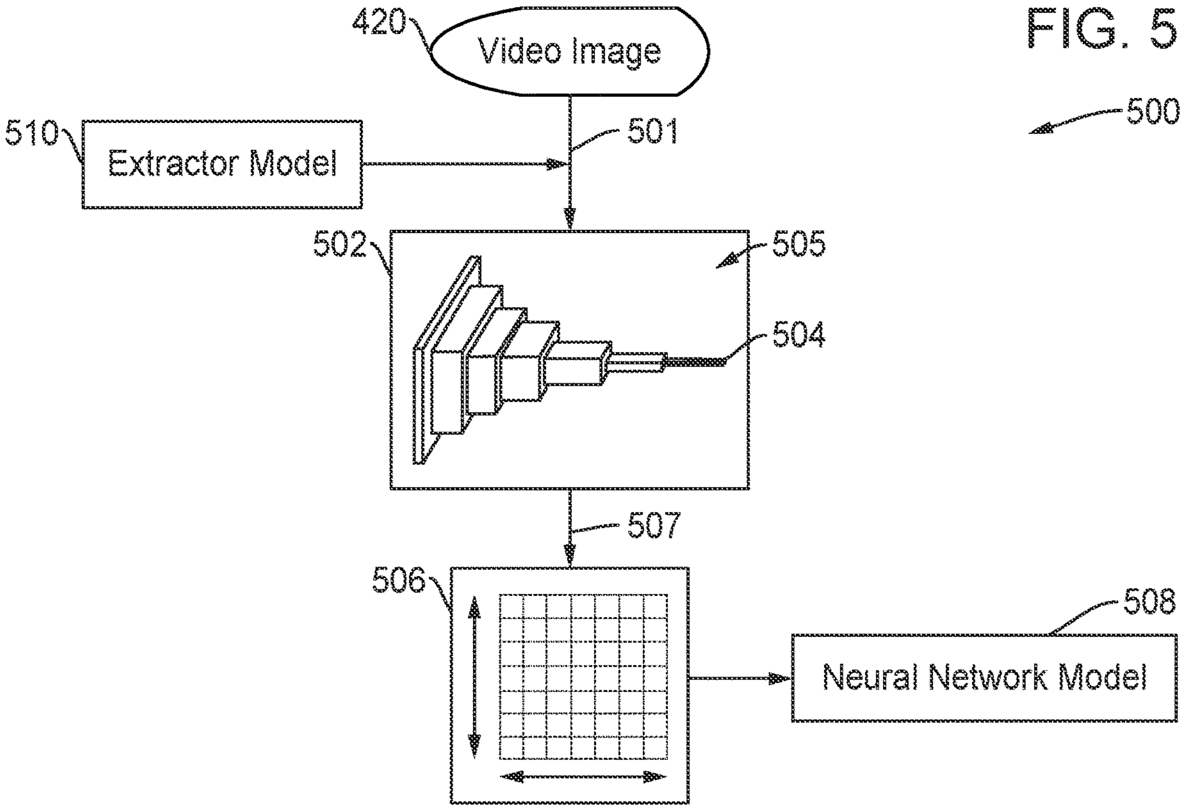
FIG. 5 illustrates a block diagram of a process to convert video images into multiple sequence data to train a neural network model according to the disclosed embodiments.

FIG. 5 depicts a block diagram of a process 500 to convert video images 420 into multiple sequence data 506 to train neural network model 508 according to the disclosed embodiments. Process 500 receives a video image 420 from the video data generated for each indication. Referring to indication 404, video images 420 may be generated for the derived features. Extraction operation 501 is executed on each video image 420 to extract, or generate, a plurality of spatial features for each frame of video images 420.

Extractor model 510 may be applied to video image 420 to extract spatial features. Extractor model 510 may be a pre-defined spatial feature extractor model. Extractor model 510 may be a deep learning model used for image and video data training, which is applied directly to the video data. Spatial feature extraction may be a process to identify and extract important information within digital images. Extractor model 510 may utilize edge detection to identify the boundaries of objects within an image. In other embodiments, extractor model 510 may utilize corner detection to identify specific points in an image where the intensity changes in multiple directions, indicating the presence of a corner. In still other embodiments, extractor model 510 may utilize blob detection to identify regions of the image that have similar properties, such as color or texture. In still other embodiments, extractor model 510 may utilize texture analysis to extract information about the spatial arrangement of pixels in the image to characterize its texture. In still other embodiments, extractor model 510 may utilize scale-invariant feature transform (SIFT) for detecting and describing local features in an image, which are invariant to scale and rotation. These techniques may be used individually or in combination by extractor model 510 to extract spatial features from video images 420.

Extracted feature 504 may be generated by extractor model 510. Many features may be extracted for each frame. For example, the number of features may be 256 for each frame. Each feature also corresponds to a value for the respective video image 420. Referring to process 502, feature 504 is generated by extractor model 510 reducing video image 420 using layers 505 to reduce the extracted data to a value for feature 504.

Concatenation operation 507 may be executed on extracted features 504 for each frame for a video image 420. Features 504 may be linked together in a chain or series to generate a time series value for the respective frame. For example, features 504 may be concatenated for video image 420. Each feature may be within the respective time series value at the time instance of the respective frame within time period 202. The concatenated values may be used to form a feature matrix 506 of multiple sequence data. Feature matrix 506 is disclosed in greater detail below. Feature matrix 506 also includes temporal features along with the spatial features derived from each video image 420.

Feature matrix 506 of multiple sequence data for each indication then may be used to train neural network model 508. For example, indications 402 and 404 may be used to generate a feature matrix for each indication. The unique values for each feature matrix include spatial and temporal features of the data for each indication. If indications 402 and 404 are defects, then the multiple sequence data for their respective feature matrices 506 may be used to train neural network model 508 to predict the presence of a defect. Alternatively, indication 406 may resemble a non-defect within TAI scan 114. The multiple sequence data for its feature matrix 506 may be used to train neural network model 508 to predict the presence of a non-defect.

Figure 6:
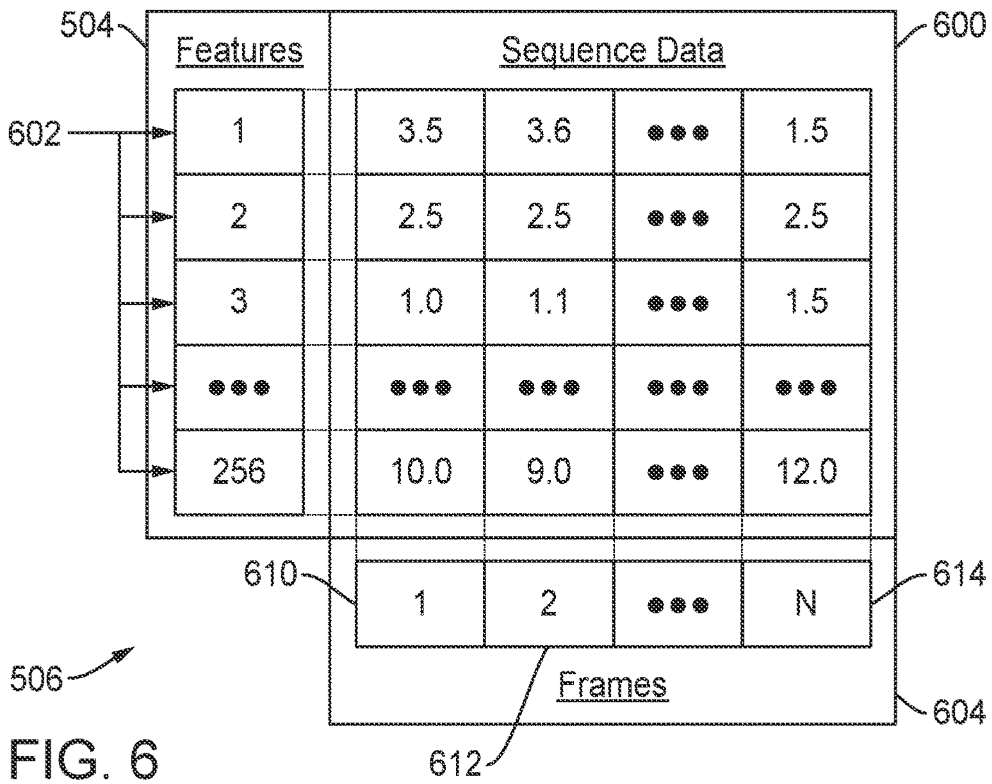
FIG. 6 illustrates an example of a feature matrix having multiple sequence data for an indication according to the disclosed embodiments.

FIG. 6 depicts an example of feature matrix 506 having multiple sequence data 600 for an indication according to the disclosed embodiments. FIG. 6 may refer to FIGS. 1-5 for illustrative purposes. Feature matrix 506 and multiple sequence data 600, however, are not limited to the embodiments disclosed by FIGS. 1-5.

Features 504 may be derived using the embodiments disclosed in FIGS. 1-5. Concatenation operation 507 provides the concatenated values for features 504 to feature matrix 506. These values may correspond to the spatial features for an indication, such as spatial feature 405 for indication 404. As disclosed above, the number of features may vary. Feature matrix 506 should include many features, such as 256 or 512. These may be represented in the rows of feature matrix 506. A specific value for a specific feature at a specific time or within a specific frame may be defined by row number and column number.

For example, feature matrix 506 may include 256 features. Each feature includes a value for each frame processed according to the disclosed embodiments. Thus, the rows 602 may include feature 1, feature 2, feature 3, and so on to feature 256. The features are extracted from video images 420 by extractor model 510. Values are determined for each feature using extractor model 510.

Feature matrix 506 also includes columns that correspond to the number of frames 604 within the plurality of frames of TAI scan 114. Each frame may correspond to a video image 420 for the indication processed as disclosed above. For example, the number of the plurality of frame may be N. The number of data sets for the feature values of features 504 also is N. Thus, frames 604 represent the value of a feature over all time units. Feature matrix 506, therefore, includes temporal features along with the spatial features.

As may be appreciated, the values for features 504 may differ over time for each indication processed according to the embodiments disclosed above. For example, feature 1 of features 504 may have a value of 3.5 for frame 1 of frames 604. Feature 1 may have a value of 3.6 for frame 2. Feature 1 may have additional values up to a value of 1.5 for frame N. Feature 2 of features 504 may have a value of 2.5 for all frames 604. Feature 2, therefore, appears to stay the same for the process to generate TAI scan 114. Feature 3 of features 504 may have a value of 1.0 for frame 1 of frames 604, a value of 1.1 for frame 2, and additional values for frames 604 up to a value of 1.5 for frame N. Feature 256 may be last feature of features 504 derived by extractor model 510. It may have a value of 10.0 for frame 1 of frames 604, a value of 9.0 for frame 2, and additional values for frames 604 up to a value of 12.0 for frame N. These values are the multiple sequence data 600 used to train neural network model 508.

It also may be appreciated that each column or time instance of frames 604 includes the concatenated features for a video image 420, or frame. Each row represents a time series for one feature, such as feature 1. The time series values are placed within feature matrix 506 to populate the matrix with multiple sequence data 600. For example, value 610 represents the concatenated feature values for frame 1. Value 612 represents the concatenated features value for frame 2, and so on to value 614 for the concatenated feature values for frame N.

Feature matrix 506 includes patterns in the image data for indications over a period of time. Thus, spatial and temporal features also may form a pattern for an indication. Indication 404 should form a different pattern than indication 406 in the different sets of multiple sequence data 600. Neural network model 508 is trained to recognize these patterns for the indications identify in a TAI scan 114. For example, if indication 404 is identified as a defect, then multiple sequence data 600 for indication 404 should be used to train neural network model 508 as a defect. After being trained, neural network model 508 will receive multiple sequence data 600 for indications having an unknown status and match its patterns to the patterns of multiple sequence data for known defects.

Figure 7:
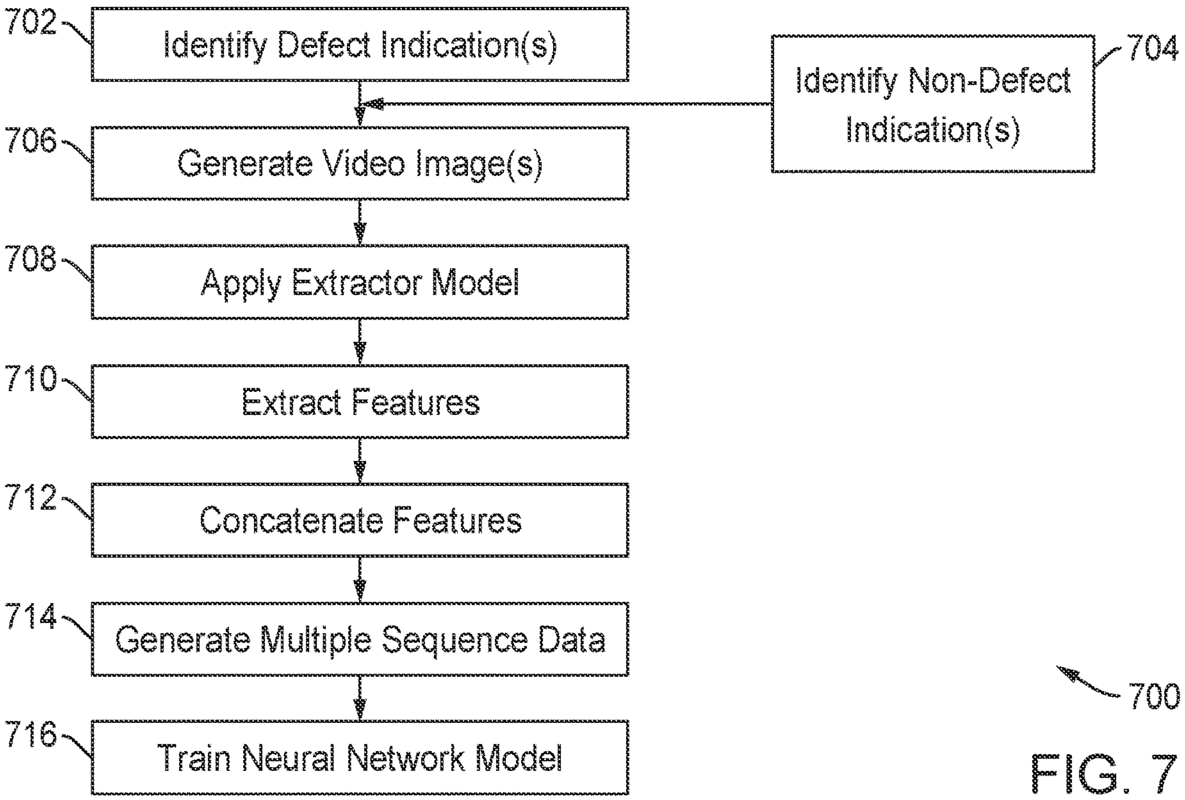
FIG. 7 illustrates a flowchart for training a neural network model using indications within a TAI scan according to the disclosed embodiments.

FIG. 7 depicts a flowchart 700 for training a neural network model 508 using indications within a TAI scan 114 according to the disclosed embodiments. Flowchart 700 may refer to FIGS. 1-6 for illustrative purposes. Flowchart 700, however, is not limited to the embodiments disclosed by FIGS. 1-6.

Step 702 executes by identifying indications within the TAI scan data having one or more defects. For example, TAI inspection system 100 may generate TAI scan 114. Indication 404 may be identified as having a defect within a frame 204 of the scan. Additional indications may be identified in frame 204, such as indication 402, as also having defects. Step 704 executes by identifying indications within the TAI scan data having one or more non-defects, or false samples. Much like step 702, indication 406 may be identified within frame 204 as not having a defect.

For steps 706-716 of flowchart 700, each indication may be subject to the disclosed actions with regard to processing the indication for training neural network model 508. It does not matter if the indication is from step 702 or step 704. The indications may be annotated with its respective statuses.

Step 706 executes by generating one or more video images 420 of the indication. Three sets of data are derived from the image data of the indication from frame 204. At least one set of data is temperature data corresponding to the pixels within the frames showing the indication. The data from the temperature data and derived data may be provided to channels 412, 414, and 416 to video encoder 418. Video encoder 418 generates a video image 420 for the indication from each frame of the plurality of frames related to the indication in TAI scan 114.

Step 708 executes by applying extractor model 510 to video image 420 to extract features 504. A value, or data point, may be extracted for each feature. Step 710 executes by extracting features 504 for each video image, or frame, 420 for the indication. Each image for each time instance is processed using extractor model 510 to extract the respective features therein. Step 712 executes by concatenating features 504 to generate a time series value, such as time series value 610, 612, or 614 disclosed above.

Step 714 executes by generating multiple sequence data 600 using the time series values generated by concatenating operation 507. As disclosed by FIG. 6, multiple sequence data 600 includes values for the features over a period of time, or a plurality of frames. These values may include patterns within the data derived by processing the frames of the indication to identify that indication based on its status as a defect or non-defect.

Step 716 executes by training neural network model 508 with the sets of multiple sequence data 600 in features matrices 506, as annotated. Neural network model 508 is trained with multiple sequence data 600 based on indications identified in step 702 and on indications identified in step 704. Further, non-defects should be identified to further train neural network model 508 during defect identification operations. For example, the neural network training may be one-step training. The input is a set of defect and non-defect indications. The indications are converted into multiple sequence data 600. After the training, the trained model can be used to predict whether an indication is a defect or non-defect.

Figure 8:
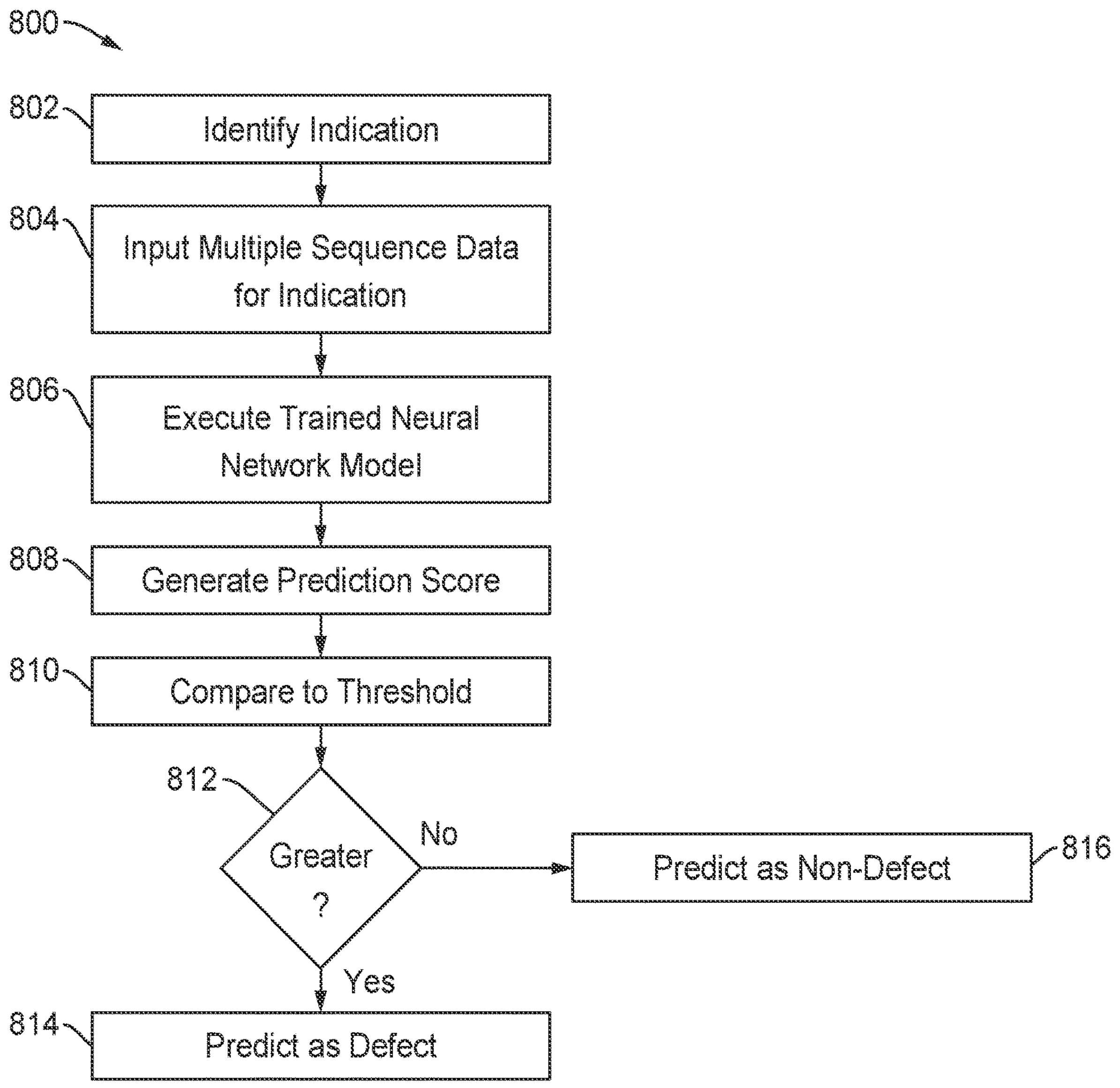
FIG. 8 illustrates a flowchart for detecting a status of an indication within a TAI scan of a blade using a trained neural network 508 according to the disclosed embodiments.

FIG. 8 depicts a flowchart 800 for detecting a status of an indication within a TAI scan 114 of a blade 104 using a trained neural network 508 according to the disclosed embodiments. Flowchart 800 may refer to FIGS. 1-7 for illustrative purposes. Flowchart 800, however, is not limited to the embodiments disclosed in FIGS. 1-7.

Step 802 executes by identifying an indication within a TAI scan 114 as having a possible defect. No rescan is available to compare against the original scan data so the disclosed processes are used to determine whether the identified indication is probably a defect within blade 104. Unlike indications used to trained neural network model 508, this indication is not determined to be a defect or a non-defect.

Step 804 executes by inputting multiple sequence data 600 for the identified indication into neural network model 508. Multiple sequence data 600 may generated using steps 706-714 disclosed above. These processes are not repeated here for brevity. Multiple sequence data 600 captures the spatial and temporal features of the indication as provided in the plurality of frames for the scan of blade 104.

Step 806 executes by executing trained neural network model 508 on multiple sequence data 600 for the indication. Multiple sequence data 600 is analyzed using the trained model to determine the likelihood that the values of the data represent a defect given the spatial and temporal features therein. Step 808 executes by generating a defect prediction score from neural network model 508 for multiple sequence data 600 for the indication. In some embodiments, the defect prediction score is a probability between 0 and 1 that the indication is a defect based on the extracted spatial features and the temporal features. The higher the score indicates the greater probability that the indication is a defect.

Step 810 executes by comparing the defect prediction score to a threshold. The threshold corresponds to a cut off that is desired for predicting defects on blade 104. A higher threshold indicates that TAI inspection system 100 is not trying to identify every possible defect on blade 104. A lower threshold is the opposite in that it is important to identify every potential defect. For example, the threshold may be 0.5, or 50%.

Step 812 executes by determining whether the defect prediction score for multiple sequence data 600 for the indication is greater than the threshold. In some embodiments, the comparison determines if the defect prediction score is greater than or equal to the threshold. If step 812 is yes, then step 814 executes by predicting the indication is a defect. The output may be provided by TAI inspection system 100 to check blade 104. If step 812 is no, then step 816 executes by predicting the indication is not a defect.

Results may be fed back into trained neural network model 508 to improve prediction results. As disclosed above, false positive or false negatives also may be used to further train neural network model 508.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, the present invention may take the form of a computer program product embodied in any tangible medium of expression having computer-usable program code embodied in the medium.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

Modifications and equivalents may be made to the features of the claims without departing from the spirit or scope of the invention. Thus, it is intended that the present invention covers the modifications and variations disclosed above provided that these changes come within the scope of the claims and their equivalents.

The invention claimed is:

1. A method comprising:

generating a training thermal acoustic imaging (TAI) scan of a first component, wherein the training TAI scan includes a plurality of frames showing known positive and false samples of a defect within the training TAI scan of the first component;

applying a visual feature extractor model to the plurality of frames within the training TAI scan;

extracting a plurality of spatial features for a signal corresponding to a selected indication type shown in the training TAI scan using the visual feature extractor model;

concatenating the plurality of spatial features of the signal from each frame of the plurality of frames to generate a time series value for the respective frame;

combining a plurality of the time series values into multiple sequence data for the training TAI scan, wherein the multiple sequence data includes a plurality of temporal features;

training a neural network model using the multiple sequence data to predict the selected indication type in the training TAI scan as being a defect or a non-defect within the first component; and applying the trained neural network model to a subsequent TAI scan to predict whether the subsequent TAI scan includes a possible defect or non-defect for a second component.

2. The method of claim 1, wherein the visual feature extractor model is a trained visual feature extractor model.

3. The method of claim 1, wherein generating a training TAI scan includes capturing thermal radiation using an inspection system.

4. The method of claim 1, further comprising generating a plurality of video images corresponding to the plurality of frames.

5. The method of claim 4, wherein the plurality of video images capture the plurality of spatial features.

6. The method of claim 1, wherein one of the plurality of spatial features relates to temperature data captured within each frame of the plurality of frames of the training TAI scan.

7. The method of claim 1, further comprising identifying a pattern within the plurality of frames using the concatenated plurality of spatial features.

8. The method of claim 7, wherein the pattern corresponds to the known defect.

9. A method comprising:

receiving an initial thermal acoustic imaging (TAI) scan of a component, wherein the initial TAI scan includes a plurality of frames showing an identified possible defect within the component;

applying a trained neural network model to the plurality of frames of the initial TAI scan; and predicting whether the initial TAI scan with the identified possible defect is an actual defect or non-defect for the component using the trained neural network model, wherein the trained neural network model is trained by generating a training TAI scan, wherein the training TAI scan includes a plurality of frames showing known positive and false samples of a defect within a training component;

applying a visual feature extractor model to the plurality of frames within the training TAI scan;

extracting a plurality of spatial features for a signal corresponding to a selected indication type shown in the training TAI scan using the visual feature extractor model;

concatenating the plurality of spatial features of the signal from each frame of the plurality of frames to generate a time series value for the respective frame;

combining a plurality of the time series values into multiple sequence data for the training TAI scan, wherein the multiple sequence data includes a plurality of temporal features; and training the trained neural network model using the multiple sequence data to predict the selected indication type as being a defect or non-defect within the training TAI scan.

10. The method of claim 9, further comprising capturing the training TAI scan using an infrared camera.

11. The method of claim 9, wherein the plurality of spatial features includes at least one feature related to heat captured by the infrared camera.

12. The method of claim 9, wherein the visual feature extractor model is a trained visual feature extractor model.

13. The method of claim 9, further comprising identifying a pattern within the plurality of frames using the concatenated plurality of spatial and temporal features.

14. The method of claim 13, wherein the pattern corresponds to the known defect.

15. A method comprising:

generating a training thermal acoustic imaging (TAI) scan of a first component, wherein the training TAI scan includes a plurality of frames showing at least one indication within the training TAI scan of the first component;

generating video data for the at least one indication within the plurality of frames, wherein the video data uses three different channels, wherein at least one channel includes temperature data of the at least one indication;

applying a visual feature extractor model to the video data for the plurality of frames within the training TAI scan;

extracting a plurality of spatial features for the video data corresponding to a selected indication type shown in the training TAI scan using the visual feature extractor model;

concatenating the plurality of spatial features of the signal from each frame of the plurality of frames to generate a time series value for the respective frame;

combining a plurality of the time series values into multiple sequence data for the training TAI scan, wherein the multiple sequence data includes a plurality of temporal features;

training a neural network model using the multiple sequence data to predict the selected indication type in the training TAI scan as being a defect or a non-defect within the first component; and applying the trained neural network model to a subsequent TAI scan to predict whether the subsequent TAI scan includes a possible defect or non-defect for a second component.

16. The method of claim 15, further comprising including an indication annotation with the multiple sequence data to the neural network model.

17. The method of claim 15, further comprising identifying the at least one indication within the plurality of frames of the training TAI scan.

18. The method of claim 17, wherein the at least one indication includes a first indication and a second indication.

19. The method of claim 18, wherein the first indication is a positive sample of a defect and the second indication is a false sample of a defect.

* * * * *